(12) United States Patent
Lee et al.

(10) Patent No.: US 9,902,631 B2
(45) Date of Patent: *Feb. 27, 2018

(54) KIT FOR WASTEWATER TREATMENT, AND MANUFACTURING METHOD FOR AND USE OF PHOTOCATALYST

(71) Applicant: National Tsing Hua University, Hsinchu (TW)

(72) Inventors: Kuan-Ting Lee, Hsinchu (TW); Shih-Yuan Lu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 413 days.

This patent is subject to a terminal disclaimer.

(21) Appl. No.: 14/671,219

(22) Filed: Mar. 27, 2015

(65) Prior Publication Data
US 2016/0102001 A1 Apr. 14, 2016

(30) Foreign Application Priority Data
Oct. 9, 2014 (TW) .............................. 103135208 A

(51) Int. Cl.
*B01J 35/00* (2006.01)
*B01J 37/04* (2006.01)
(Continued)

(52) U.S. Cl.
CPC ............ *C02F 1/725* (2013.01); *B01J 23/835* (2013.01); *B01J 35/004* (2013.01); *B01J 35/0013* (2013.01); *B01J 37/009* (2013.01); *B01J 37/04* (2013.01); *C01G 49/0018* (2013.01); *C01G 49/0063* (2013.01); *C01G 49/0072* (2013.01); *C01G 49/08* (2013.01); *C01G 53/40* (2013.01); *C01P 2002/72* (2013.01); *C01P 2002/82* (2013.01); *C01P 2004/04* (2013.01); *C01P 2004/64* (2013.01); *C01P 2006/42* (2013.01); *C02F 1/32* (2013.01); *C02F 2305/02* (2013.01); *C02F 2305/10* (2013.01); *Y02W 10/37* (2015.05)

(58) Field of Classification Search
None
See application file for complete search history.

(56) References Cited

U.S. PATENT DOCUMENTS

2013/0168228 A1* 7/2013 Ozin .................. B01J 35/004
204/157.9

FOREIGN PATENT DOCUMENTS

CN 102701314 A 10/2012

OTHER PUBLICATIONS

Lee et al., "SnO2 Quantum Dots Synthesized with a Carrier Solvent Assisted Interfacial Reaction for Band-Structure Engineering of TiO2 Photocatalysts", J. Phys. Chem. C, 2014, vol. 118, pp. 14457-144636.

* cited by examiner

*Primary Examiner* — Krishnan S Menon
*Assistant Examiner* — Bradley R Spies
(74) *Attorney, Agent, or Firm* — Muncy, Geissler, Olds & Lowe, P.C.

(57) ABSTRACT

The present invention relates to a kit for water treatment, comprising: a photocatalyst including at least one of $SnFe_2O_4$, $ZnFe_2O_4$, $CuFe_2O_4$, $Fe_3O_4$, $MnFe_2O_4$ and $NiFe_2O_4$; and an active oxide. The present invention also relates to a method for manufacturing a photocatalyst and a use of the prepared photocatalyst.

3 Claims, 6 Drawing Sheets

(51) Int. Cl.
*B01J 37/00* (2006.01)
*C01G 49/08* (2006.01)
*C02F 1/72* (2006.01)
*C01G 49/00* (2006.01)
*B01J 23/835* (2006.01)
*C01G 53/00* (2006.01)
*C02F 1/32* (2006.01)

KIT FOR WASTEWATER TREATMENT, AND MANUFACTURING METHOD FOR AND USE OF PHOTOCATALYST

CROSS REFERENCE TO RELATED APPLICATION

This application claims the benefits of the Taiwan Patent Application Serial Number 103135208, filed on Oct. 9, 2014, the subject matter of which is incorporated herein by reference.

BACKGROUND OF THE INVENTION

Field of the Invention

The present invention relates to a kit for water treatment, and a manufacturing method for and a use of a photocatalyst, more particularly, to a kit for wastewater treatment, and a manufacturing method for and a use of a photocatalyst.

Generally, the method for wastewater treatment is divided into three main types, such as physical treatment, chemical treatment, and biological treatment. In industrial applications, chemical oxidation treatment is most common. According to the species of the oxidant, chemical oxidation treatment can be classified into four types of oxidation, including air oxidation, ozonation, reagent oxidation, and advanced oxidation. Among the chemical oxidation treatments, advanced oxidation has the advantages of rapid reaction, and the oxidation is not limited by the concentration of the pollutant. Many studies in industry and academia have been focused on this type of water treatment, wherein the mechanism of the said treatment process is generation of the hydroxyl free radicals having high oxidative capacity for oxidizing the organic compounds, thus achieving the effect of removing the pollutants.

However, the advanced oxidation treatments, such as Fenton treatment, ozonation, high efficiency electrolytic oxidation, wet chemistry oxidation, photo-oxidation using $TiO_2$, have their own disadvantages. For example, Fenton treatment may produce iron sludge, and photo-oxidation using $TiO_2$ may be limited by the wavelength of the irradiating light, causing inconveniences when the treatment is practically applied.

Therefore, it is desirable to provide a photocatalyst and a method for manufacturing the same, which is capable of rapidly treating the wastewater without the disadvantages such as producing additional waste and so on.

SUMMARY OF THE INVENTION

The object of the present invention is to provide a kit for water treatment, which is able to rapidly treat the wastewater without producing additional waste. Since the photocatalyst has an excellent photocatalytic effect with respect to visible light, the photocatalyst is more applicable than the other photocatalysts known in the art.

To achieve the object, the present invention provides a kit for water treatment, comprising: a photocatalyst, including at least one of $SnFe_2O_4$, $ZnFe_2O_4$, $CuFe_2O_4$, $Fe_3O_4$, $MnFe_2O_4$ and $NiFe_2O_4$; and an active oxide.

According to the kit for water treatment described above, when the kit for water treatment is used to treat an organic pollutant, the weight of the photocatalyst, and active oxide, and the organic pollutant meet the following requirements:

$0.1 \leq$ (weight of the photocatalyst $\times 10^5$)/(weight of the active oxide/weight of the photocatalyst)$\leq 1.3$.

Preferably, the numerical range of the above equation may be 0.15 to 0.8, and more preferably, may be 0.25 to 0.4. Moreover, in order to achieve the best photocatalytic effect, the weight ratio of the photocatalyst to the active oxide may be $1.5 \times 10^{-5}$ to 0.17, and the weight ratio of the active oxide to the organic pollutant may be 600 to 68000.

According to the kit for water treatment described above, the photocatalyst and the active oxide may be contained in different containers, or may be contained in separated containing regions of a same container to achieve the better water treatment effect. In an embodiment of the present invention, for example, the phtotcatalyst may be contained in a first container, and the active oxide may be contained in a second container, but the present invention is not limited thereinto. In another embodiment of the present invention, for example, the photocatalyst and the active oxide may be separately contained in a first containing region and a second containing region of one container, but the present invention is not limited thereto.

According to the kit for water treatment described above, the active oxide is preferably peroxide, superoxide, or a combination thereof, but the present invention is not limited thereto. Specifically, in an embodiment of the present invention, the active oxide may be peroxide. However, other suitable active oxides may be selected by a person skilled in the art, and the present invention is not limited thereto.

According to the kit for water treatment described above, the particle size of the photocatalyst is not particularly limited. However, for the purpose of achieving a better catalytic effect for treating wastewater with different concentrations, a person may appropriately adjust the particle size of the photocatalyst in a proper range. For example, in one embodiment of the present invention, the particle size may be 3 nm to 13 nm for the wastewater with low or medium concentration; and in another embodiment of the present invention, the particle size may be 1 nm to 3 nm for the wastewater with high concentration.

Accordingly, the kit for water treatment of the present invention is capable to achieve rapid treatment for the wastewater without producing additional waste.

The other object of the present invention is to provide a method for manufacturing a photocatalyst, and through this method, a photocatalyst applicable at the wavelength range of visible light may be rapidly prepared.

To achieve the above object, the other embodiment of the present invention provides a method for manufacturing a photocatalyst, comprising the following steps: (A) dissolving a divalent metal precursor and an iron precursor in a first solvent to form a first precursor solution; (B) mixing a second solvent with the first precursor solution to form a first mixed solution, wherein the second solvent is miscible with the first solvent; (C) adding a third solvent into the first mixed solution to obtain a layered solution, wherein the third solvent is located at an upper layer of the layered solution, and the first mixed solution is located at a lower layer of the layered solution; (D) stirring the layered solution for carrying the precursor solution from the first mixed solution into the third solvent to obtain a second mixed solution comprising a photocatalyst, wherein the photocatalyst includes at least one of $SnFe_2O_4$, $ZnFe_2O_4$, $CuFe_2O_4$, $Fe_3O_4$, $MnFe_2O_4$ and $NiFe_2O_4$; and (E) separating the photocatalyst from the second mixed solution through a centrifugation.

According to the manufacturing method described above, for the purpose of carrying the precursor solution from the first mixed solution into the third solvent, the third solvent is preferably immiscible with the second solvent, and the first solvent has a higher affinity toward the third solvent than that toward the second solvent. Therefore, as long as the used solvent has the above-mentioned properties, a person skilled in the art may select a proper first solvent based on the selected precursor, and further choose the suitable second solvent and third solvent according to the above-mentioned properties. For example, according to an embodiment of the present invention, the first solvent may be ethanol, the second solvent may be chloroform, and the third solvent may be sodium hydroxide aqueous solution, but the present invention is not limited thereto.

According to the manufacturing method described above, the divalent metal precursor and the iron precursor are not particularly limited as long as the selected precursors are dissolvable in the first solvent and are able to provide the divalent metal ion and the iron ion as needed. According to an embodiment of the present invention, for example, the divalent metal precursor may be an organic compound, an inorganic compound, or a combination thereof, such as an organic tin compound, an inorganic tin compound, or combination thereof. Preferably, the divalent metal precursor may be stannous chloride ($SnCl_2$), stannous sulfate ($SnSO_4$), stannous octoate ($C_{16}H_{30}O_4Sn$), Tin (II) hydroxide ($Sn(OH)_2$), Tin (II) sulfide (SnS), stannous nitrate ($Sn(NO_3)_2$), or a combination thereof, but the present invention is not limited thereto. In another embodiment of the present invention, the iron precursor may be a trivalent iron compound. Preferably, the iron precursor may be ferric bromide ($FeBr_3$), ferric phosphate ($FePO_4$) and a hydrate thereof, ferric sulfate ($Fe_2(SO_4)_3$), ferric hydroxide ($Fe(OH)_3$), ferric chlorate ($Fe(ClO_3)_3$), ferric nitrate ($Fe(NO_3)_3$), ferric chloride and a hydrate thereof, or a combination thereof, but the present invention is not limited thereto.

According to the manufacturing method described above, in step (D), as long as the precursor solution may be carried from the first mixed solution into the third solvent, the stirring manner used in this step is not particularly limited. Preferably, the stirring process is performed without disturbing the interface between the third solvent and the first mixed solution. In one embodiment of the present invention, for example, the stirring process may be performed by using a stir bar at a speed of 100 rpm to 1000 rpm, but the present invention is not limited thereto.

After step (E) of the manufacturing method described above, the photocatalyst may be present in the precipitate or in the supernatant after centrifugation according to the particle size of the photocatalyst. Hence, a person skilled in the art may select a suitable photocatalyst according to the application. In an embodiment of the present invention, for example, when the photocatalyst in need should have a particle size of 3 nm to 13 nm, the photocatalyst may be obtained in the precipitate after the centrifugation. In another embodiment of the present invention, when the photocatalyst in need should have a particle size of 1 nm to 3 nm, the photocatalyst may be obtained in the supernatant after the centrifugation.

The manufacturing method described above may further comprise a step of cleaning the obtained photocatalyst using a cleaning agent for purifying the obtained photocatalyst after step (E). In addition, the cleaning agent is not particularly limited in the present invention as long as the photocatalyst is not dissolved in the cleaning agent and the cleaning agent is easy to be removed. In one embodiment of the present invention, for example, the cleaning agent may be water, ethanol, or a combination thereof, but the present invention is not limited thereto. Further, after step (E), the photocatalyst may be dried by the known method in the art.

According to the method for manufacturing the photocatalyst, the photocatalyst applicable at the wavelength range of visible light may be rapidly prepared.

The other object of the present invention is to provide a use of the aforementioned photocatalyst, which is mainly applied for wastewater treatment. The phototcatalyst may be at least one of $SnFe_2O_4$, $ZnFe_2O_4$, $CuFe_2O_4$, $Fe_3O_4$, $MnFe_2O_4$, and $NiFe_2O_4$. Hence, using the phototcatalyst of at least one of $SnFe_2O_4$, $ZnFe_2O_4$, $CuFe_2O_4$, $Fe_3O_4$, $MnFe_2O_4$, and $NiFe_2O_4$, the organic compounds in the wastewater may be rapidly degraded in a light with a wavelength range of visible light.

DETAILED DESCRIPTION OF THE PREFERRED EMBODIMENT

Manufacture of the Photocatalyst

Preparative Examples 1 to 5

Figure 1A:
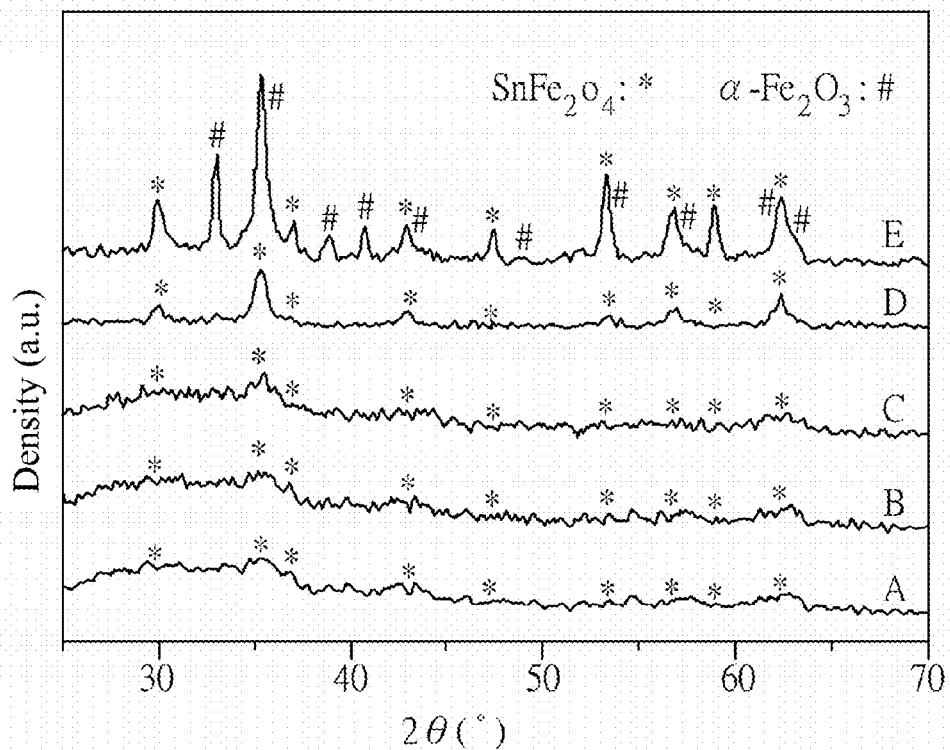
FIG. 1A shows XRD spectra of the photocatalysts A to E prepared in Preparative examples 1 to 5.

With reference to the following Table 1, appropriate amounts of the divalent metal precursor ($SnCl_2$) and the iron precursor ($Fe(NO_3)_3$) are dissolved in 22.5 ml of the first solvent (ethanol), wherein the content ratio (molar ratio) of the stannous ion and the ferric ion is 1:2. 3.75 ml of the ethanol solution dissolving with the divalent metal precursor and the iron precursor is added into 3.75 ml of the second solvent (chloroform), followed by adding 7.5 ml of the third solvent (sodium hydroxide (NaOH) aqueous solution, 1M) therein. The mixture is stirred at a speed of 400 rpm for 30 minutes. The upper-layer solution is separated and an appropriate amount of ethanol is added into the separated upper-layer solution, and then the precipitate is separated from the mixture solution of the upper-layer solution and ethanol and collected by the centrifugation. Then, the obtained precipitate is rinsed with ethanol and collected by the centrifugation several times, followed by performing the drying process to afford the photocatalyst A to E ($SnFe_2O_4$) prepared in the preparative examples 1 to 5.

TABLE 1

| | Precursor | | Photo-catalyst | Particle Size (nm) | Energy Gap (eV) |
|---|---|---|---|---|---|
| | $SnCl_2$ (g) | $Fe(NO_3)_3$ (g) | | | |
| Preparative example 1 | 0.03 | 0.11 | A | 3.0 | 2.53 |
| Preparative example 2 | 0.05 | 0.21 | B | 4.3 | 2.53 |

TABLE 1-continued

| | Precursor | | Photo-catalyst | Particle Size (nm) | Energy Gap (eV) |
|---|---|---|---|---|---|
| | $SnCl_2$ (g) | $Fe(NO_3)_3$ (g) | | | |
| Preparative example 3 | 0.10 | 0.43 | C | 6.3 | 2.53 |
| Preparative example 4 | 0.20 | 0.85 | D | 12.6 | 2.53 |
| Preparative example 5 | 0.30 | 1.28 | E | — | 2.53 |
| Preparative example 6 | 0.03 | 0.11 | F | — | — |

Preparative Example 6

Referring to Table 1, appropriate amounts of divalent metal precursor ($SnCl_2$) and the iron precursor ($Fe(NO_3)_3$) are dissolved in the 22.5 ml of the first solvent (ethanol), wherein the content ratio (molar ratio) of the stannous ion and the ferric ion is 1:2. 3.75 ml of the ethanol solution dissolving with the divalent metal precursor and the iron precursor is added into 3.75 ml of the second solvent (chloroform), followed by adding 7.5 ml of the third solvent (sodium hydroxide (NaOH) aqueous solution, 1M) therein. The mixture is stirred at a speed of 400 rpm for 30 minutes. The upper-layer solution is separated and an appropriate amount of ethanol is added into the separated upper-layer solution, and then the supernatant is obtained from the mixture of the upper-layered solution and ethanol by the centrifugation. The obtained supernatant comprises the photocatalyst F of Preparative example 6. The particle size and the crystal characteristics of the photocatalyst F prepared by Preparative example 6 is analyzed by Transmission Electron Microscopy (TEM), and the analytical results are shown in FIG. 1B.

Characterizations

For detailed description, the properties of the prepared photocatalyst are optionally analyzed.

Figure 1B:
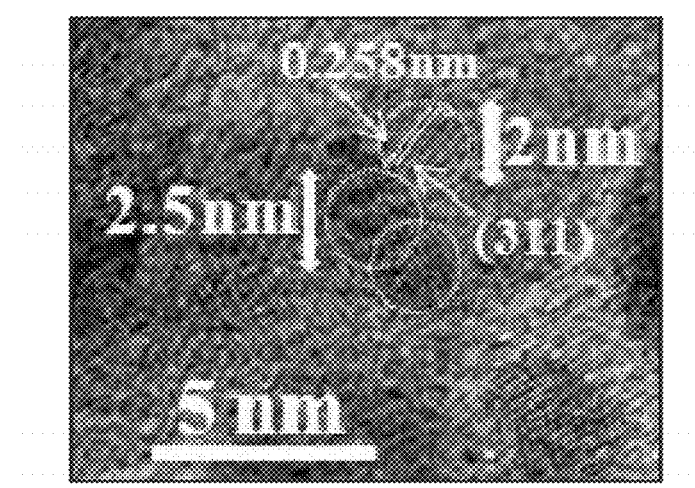
FIG. 1B is a TEM image of the photocatalyst F prepared in Preparative example 6.
Figure 2:
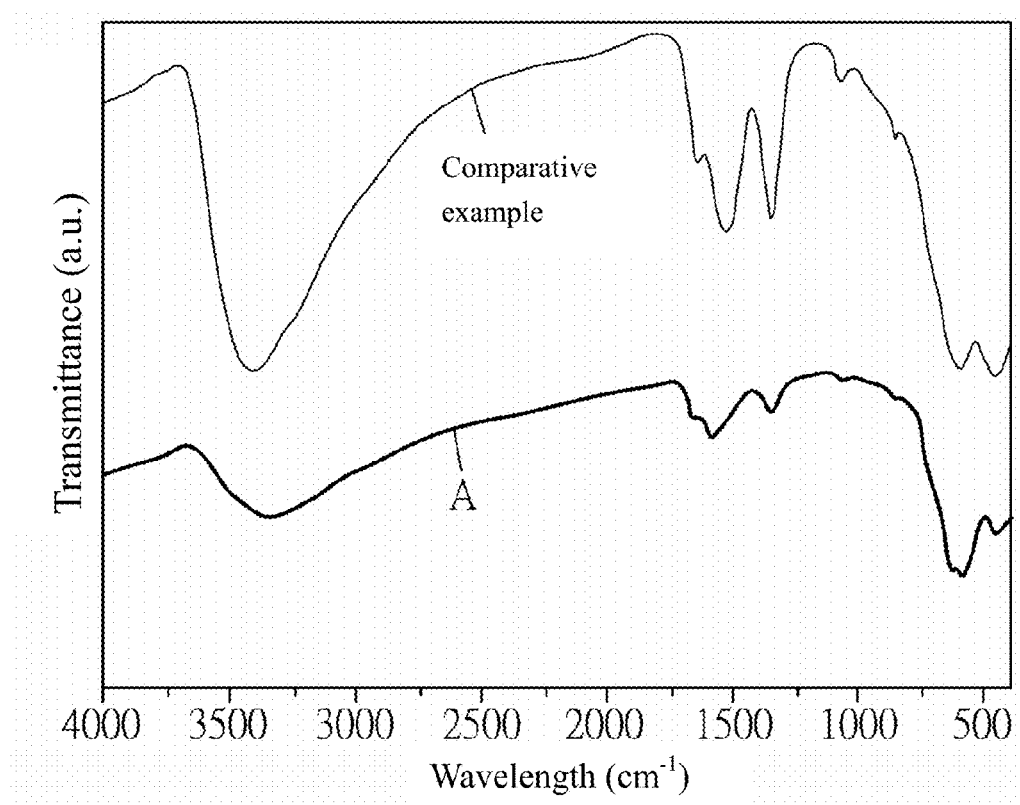
FIG. 2 is an IR spectrum of the photocatalyst A prepared in Preparative example 1.

Please refer to FIG. 1A, which shows results of the X-ray diffraction spectrum analysis (XRD) of the photocatalysts A to E prepared by Preparative examples 1 to 5. As shown in FIG. 1A, all the photocatalysts A to E have the diffraction peaks of $SnFe_2O_4$ (at the position marked by *). In addition, the photocatalyst E prepared by Preparative example 5 has the diffraction peak of $\alpha$-$Fe_2O_3$ because of the higher concentration of the precursor (at the position marked by #). Please refer to FIG. 1B, which shows the TEM result of the photocatlayst prepared by Preparative example 6. As shown in FIG. 1B, the particle size of the photocatalyst F prepared by Preparative example 6 is approximately 3 nm or less, and the d-spacing of the crystalline surface (311) of $SnFe_2O_4$ is approximately 0.258 nm. Please refer to FIG. 2, which shows the Infrared (IR) spectrum of the photocatalyst A prepared by Preparative example 1, wherein the reference is a commercialized iron oxide (CAS: 1317-61-9). As shown in FIG. 2, a peak of Sn—O at 630 $cm^{-1}$, and peaks of Fe—O at 580 $cm^{-1}$ and 445 $cm^{-1}$ are observed in the photocatalyst A. Hence, the results shown in FIG. 1A, FIG. 1B and FIG. 2 indicate that the photocatalysts A to F prepared by Preparative examples 1 to 6 comprise $SnFe_2O_4$.

In addition, particle size of the photocatalysts A to E can be calculated according to the analytical results of the XRD spectra, and the energy gaps thereof can be calculated according to the UV-visible absorption spectra. The results are also shown in Table 1.

Please refer to the following Table 2, which shows the Energy-Dispersive X-ray Spectroscopy (EDX) of the photocatalyst A prepared by Preparative example 1, wherein the comparative example is a commercialized iron oxide (CAS: 1317-61-9). Table 2 shows that the atomic ratio (atomic %) of Sn and Fe atom in the photocatalyst A is approximately 1:2, indicating that the photocatalyst A indeed comprises $SnFe_2O_4$.

TABLE 2

| | Si | Sn | Fe | O | Pt |
|---|---|---|---|---|---|
| Comparative example | 80.72 | 0 | 7.10 | 11.41 | 0.77 |
| Photocatalyst A | 82.24 | 2.15 | 4.33 | 10.61 | 0.67 |

Figure 3:
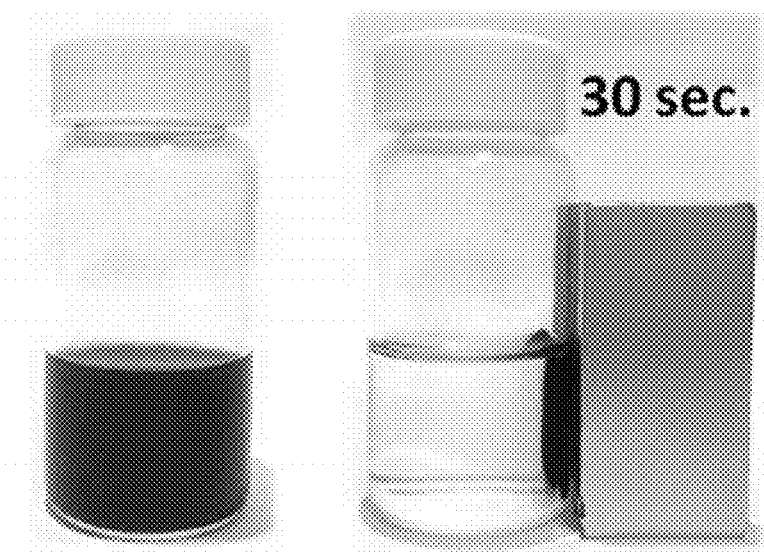
FIG. 3 is a magnetic analysis result of the photocatalyst D prepared in Preparative example 4.

With reference to FIG. 3, showing the magnetic analytical result of the photocatalyst D, the suspended photocatalyst D are attached to the side closed to the magnet after 30 seconds of magnetic attraction. It is proved that the prepared photocatalyst has excellent magnetic property.

Accordingly, as according to the results shown in FIGS. 1 to 3, Tables 1 and 2, the photocatalysts A to E prepared by the present invention do comprise $SnFe_2O_4$ and have excellent magnetic property, which are beneficial for recycling process.

Photodegradation Analysis

[Effect of the Light Sources]

First, please refer to the following Table 3, the samples are prepared by different photocatalysts, active oxides, and simulated pollutants, wherein the concentration of the photocatalysts is $1.27 \times 10^{-4}$M, the concentration of the active oxides is 2.5M, and the concentration of the stimulated pollutants is 1.2 mg/L.

TABLE 3

| Sample | Photocatalyst | Active oxide | Stimulated pollutant |
|---|---|---|---|
| 1 | A | $H_2O_2$ | RhB |
| 2 | B | | |
| 3 | C | | |
| 4 | D | | |
| 5 | E | | |
| 6 | P25 | | |
| 7 | P25 | — | |
| 8 | — | $H_2O_2$ | |
| 9 | — | — | |

Figure 4A:
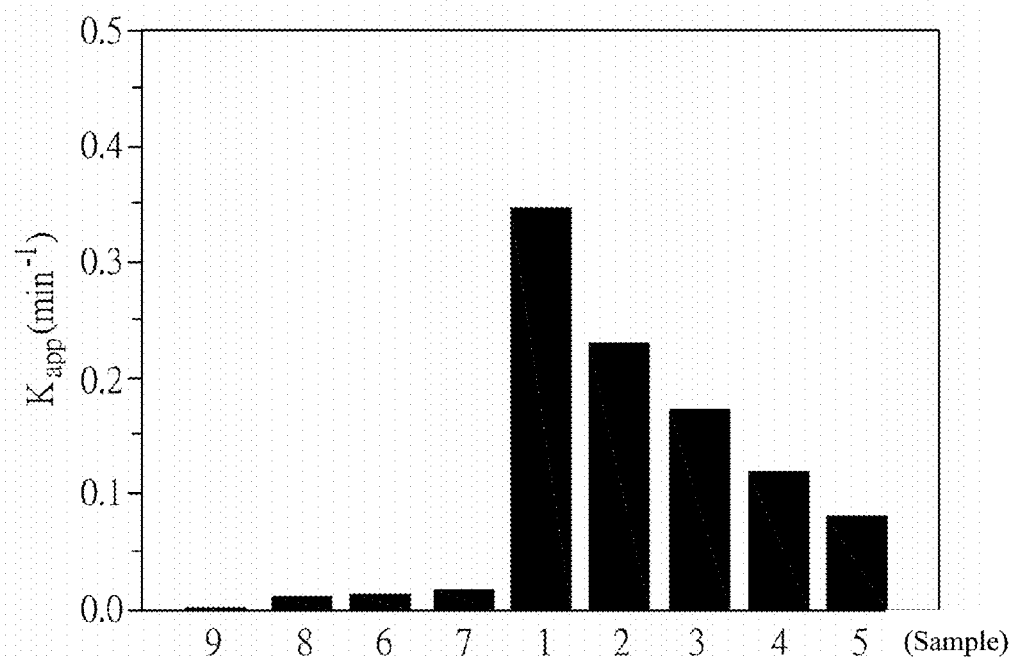
FIGS. 4A to 4D show the results of the photodegradation analysis of the examples of the present invention.

P25: $TiO_2$ photocatalyst from Degussa (Product name: AEROXIDE ® $TiO_2$ P25)
RhB: Rhodamine B Please refer to FIG. 4A, which shows the results of the photodegradation analysis of the samples 1 to 9, wherein the RhB concentration in each samples is examined while the samples are irradiated with simulated sun light (AM1.5G solar simulator, YAMASGITA DENSO, YSS-E40). In FIG. 4A, the Y-axis represents the apparent reaction rate constant ($K_{app}$) to show the photodegradation effect of each sample and comparative samples. As shown in FIG. 4A, the effects of photodegradation of the samples 1 to 5 are better than those of the samples 6 to 9, indicating that the photocatalysts and the active oxide prepared by the present invention perform excellent photodegradation effect toward RhB.

Figure 4B:
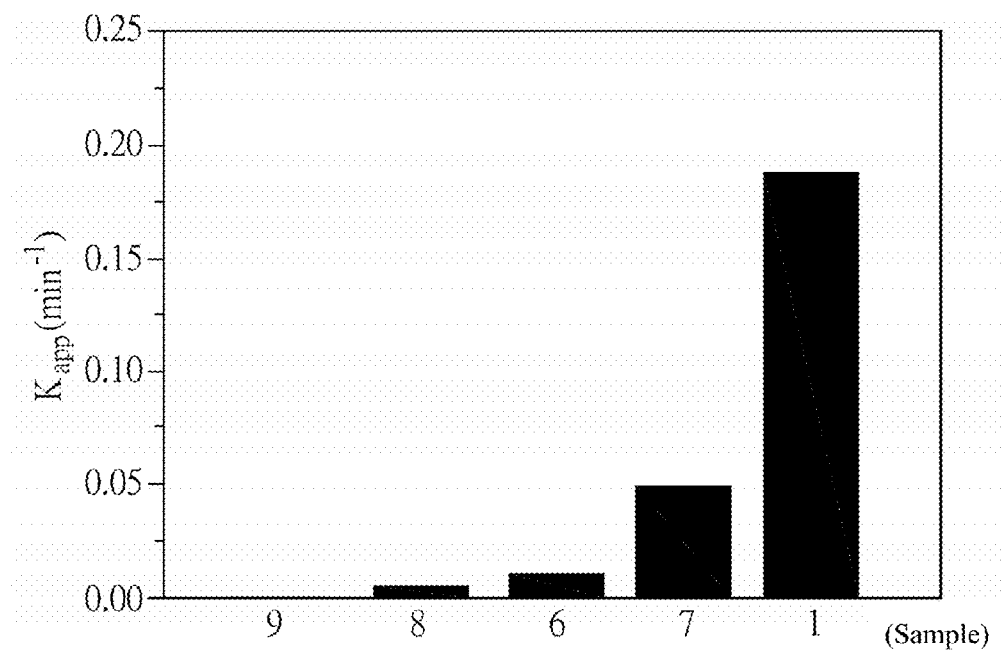

Next, please refer to FIG. 4B, which shows the results of the photodegradation analysis of the samples 1, and 6 to 9, wherein the RhB concentration in each sample is examined while the samples are irradiated with a UV light with wavelength of 352 nm. As shown in FIG. 4B, the effect of photodegradation of sample 1 is better than that of samples 6 to 9.

Figure 4C:
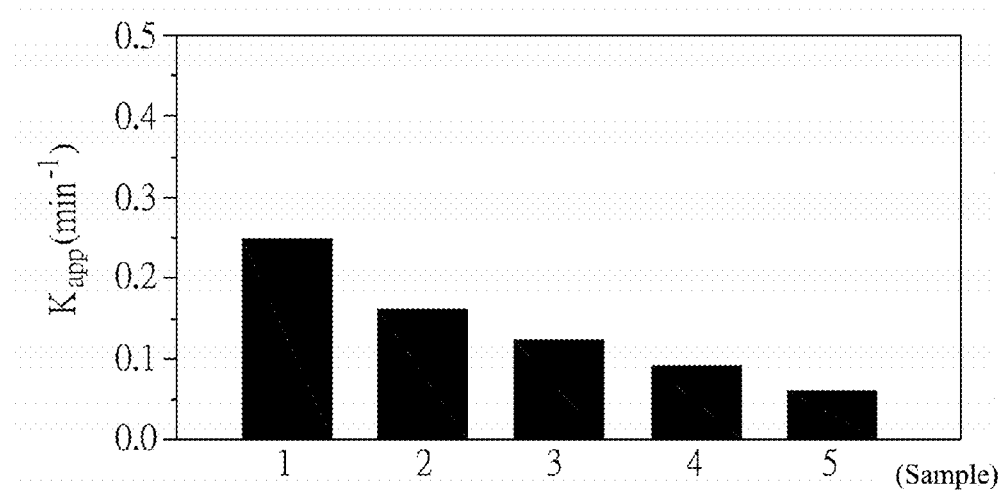

Please refer to FIG. 4C, which shows the result of the photodegradation analysis of the samples 1 to 5, wherein the RhB concentration in each samples is examined while the samples are irradiated with simulated sun light, which is filtered with a filter to remove the light having wavelength of 422 nm or less. As shown in FIG. 4C, the samples 1 to 5 still perform excellent photodegradation effect toward the light without short wavelength less than 422 nm (including UV light).

Figure 4D:
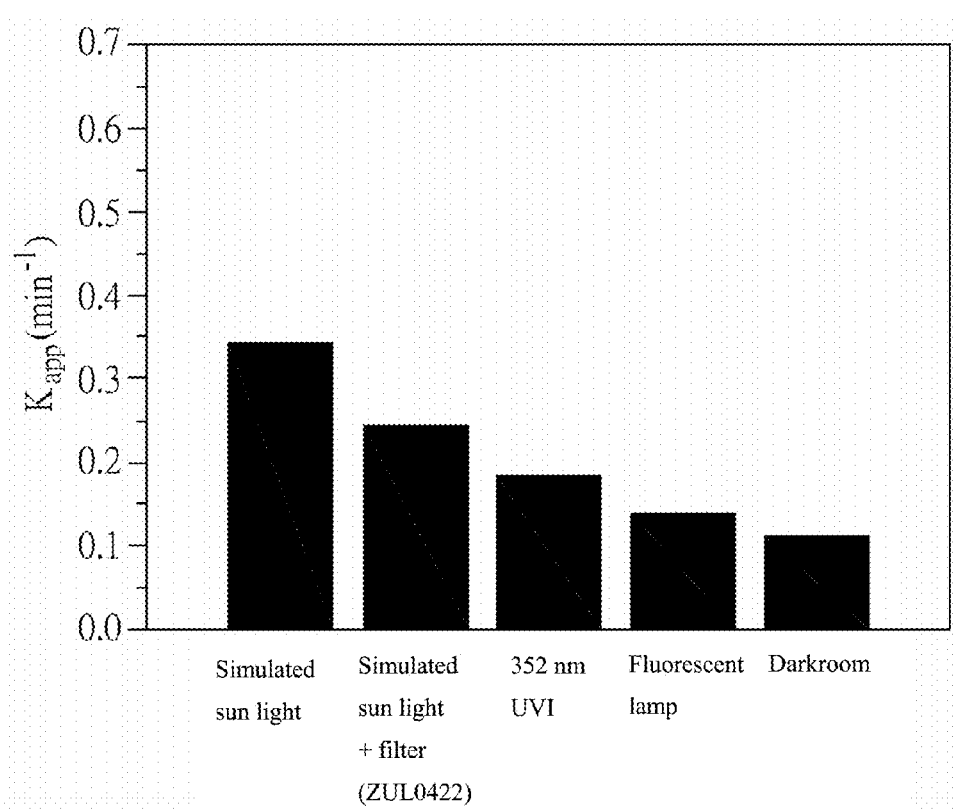

Please refer to FIG. 4D, which shows the result of the photodegradation analysis of the sample 1, wherein the RhB concentration therein is examined while this sample is irradiated with different environmental light. As shown in FIG. 4D, the sample 1 still have a certain level of photodegradation effect in the dark room and at light with different wavelengths.

Hence, according to the results shown in FIGS. 4A to 4D, it is proved that the kit for water treatment including the photocatalysts of the present invention performs excellent photodegradation effect in the presence of visible light.

[Effect of the Concentration]

Figure 5A:
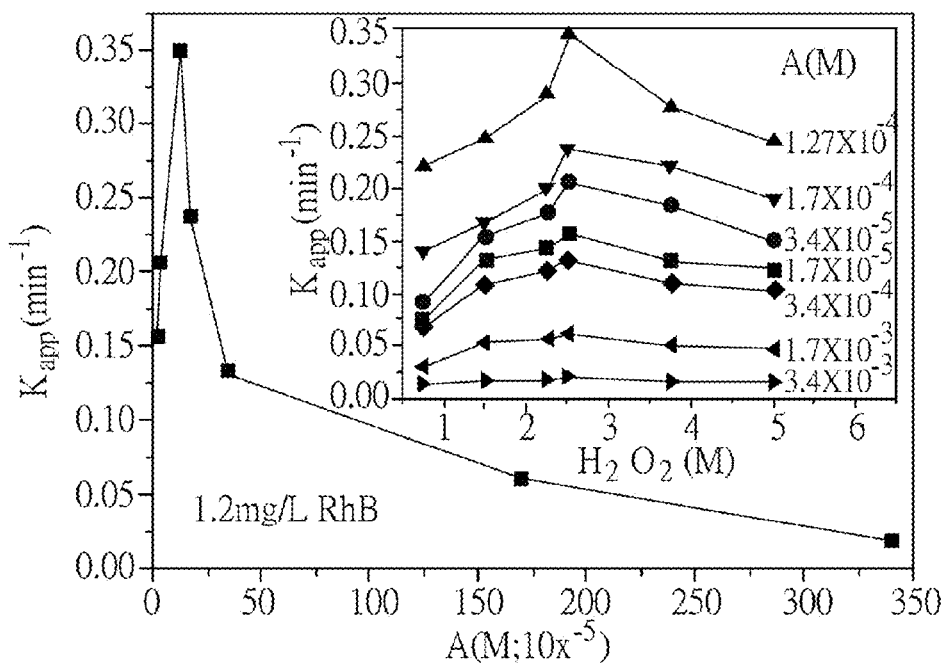
FIGS. 5A and 5B show the results of the photodegradation analysis of the examples of the present invention.

Please refer to FIG. 5A, which shows the result of the photodegradation effect of different ratio of the photocatalyst A and the active oxide to degrade a fixed concentration of pollutants, wherein the RhB concentration in each samples is examined while the samples are irradiated with a simulated sun light. As shown in FIG. 5A, under such concentration of the pollutant, the concentration of the photocatalyst and the active oxide showing the best photodegradation effect is respectively $1.27 \times 10^{-4}$ M and 2.5 M.

Figure 5B:
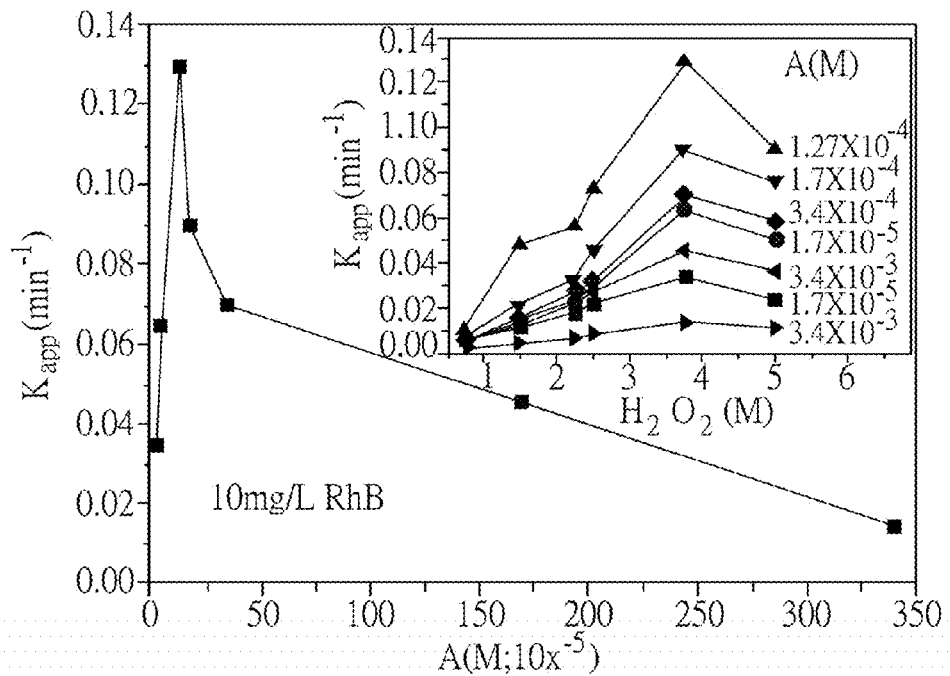

The result shown in FIG. 5B is similar to that shown in FIG. 5A, except that the RhB concentration shown in FIG. 5B is increased to 10 mg/L. As shown in FIG. 5B, under such concentration of the pollutant, the concentration of the photocatalyst and the active oxide showing the best photodegradation effect is respectively $1.27 \times 10^{-4}$ M and 3.75 M.

[Reusability]

Figure 6:
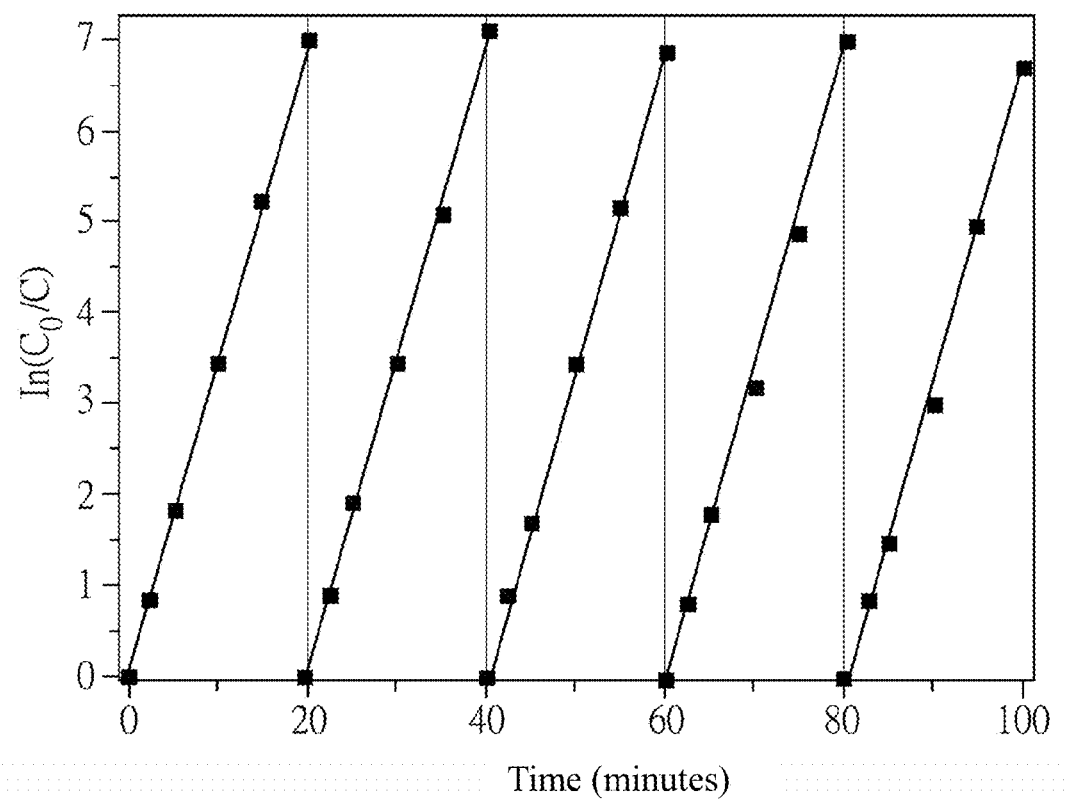
FIG. 6 shows the result of the photoderadation analysis of the example of the present invention.

Please refer to FIG. 6, which shows the photodegradation effect of the photocatalyst A to repeatedly degrade RhB. As shown in FIG. 6, there is no significant change in the reaction rate constant using $1.27 \times 10^{-4}$ M of photocatalyst A and 2.5 M of hydrogen peroxide to degrade 1.2 mg/L of RhB after repeatedly performing the photodegradation for 5 times. The reaction rate constant decreases slightly only because the loss of the photocatalyst A due to recovery. Therefore, it is proved that the photocatalyst of the present invention is reusable according to the result shown in FIG. 6.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a photocatalyst, comprising the following steps:
   (A) dissolving a divalent metal precursor and an iron precursor in a first solvent to form a first precursor solution;
   (B) mixing a second solvent with the first precursor solution to form a first mixed solution, wherein the second solvent is miscible with the first solvent;
   (C) adding a third solvent into the first mixed solution to obtain a layered solution, wherein third solvent is located at an upper layer of the layered solution, and the first mixed solution is located at a lower layer of the layered solution;
   (D) stirring the layered solution for carrying the precursor solution from the first mixed solution into the third solvent to obtain a second mixed solution comprising a photocatalyst, wherein the photocatalyst includes at least one of $SnFe_2O_4$, $ZnFe_2O_4$, $CuFe_2O_4$, $Fe_3O_4$, $MnFe_2O_4$ and $NiFe_2O_4$; and
   (E) separating the photocatalyst from the second mixed solution through a centrifugation.

2. The method as claimed in claim 1, wherein the third solvent is immiscible with the second solvent, and the first solvent has a higher affinity toward the third solvent than that toward the second solvent.

3. The method as claimed in claim 1, wherein the iron precursor is a trivalent iron compound.

* * * * *